United States Patent [19]

Cottrell

[11] Patent Number: 5,370,188
[45] Date of Patent: Dec. 6, 1994

[54] BOREHOLE ASSEMBLY, METHOD AND COMPOSITION THEREFOR

[75] Inventor: Gabriel M. J. Cottrell, Crezancy, France

[73] Assignee: Sandoz Ltd., Basle, Switzerland

[21] Appl. No.: 84,032

[22] Filed: Jun. 28, 1993

[30] Foreign Application Priority Data

Jun. 26, 1992 [FR] France .................. 92 07934

[51] Int. Cl.$^5$ .............. C04B 28/02; C04B 14/38; E21B 33/14; E21B 43/10
[52] U.S. Cl. .................. 166/369; 166/242; 166/278; 166/293
[58] Field of Search ............ 166/285, 293, 294, 287, 166/278, 369, 370, 242

[56] References Cited

U.S. PATENT DOCUMENTS

| | | | |
|---|---|---|---|
| 3,171,480 | 3/1965 | Carter | 166/292 X |
| 3,876,004 | 4/1975 | Bell et al. | 166/285 |
| 3,958,637 | 5/1976 | Cobbs | 166/287 |
| 4,548,266 | 10/1985 | Burklund | 166/285 X |
| 4,705,112 | 11/1987 | Meadows | 166/242 X |
| 4,871,395 | 10/1989 | Sugama | 106/88 |
| 4,930,575 | 6/1990 | Falk | 166/285 X |
| 5,050,679 | 9/1991 | George | 166/285 |
| 5,099,917 | 3/1992 | Roser | 166/242 X |

FOREIGN PATENT DOCUMENTS

| | | |
|---|---|---|
| 0465991 | 1/1992 | European Pat. Off. . |
| 3739997 | 6/1989 | Germany . |
| 3900050 | 7/1990 | Germany . |
| 2212489 | 7/1989 | United Kingdom . |

OTHER PUBLICATIONS

Chemical Abstracts, vol. 113, No. 11182p (1990).
P. Parcevaux, *Les Techniques De Cimentation Des Puits,* No. 338, Jan.-Feb. 1988, pp. 23-32.

*Primary Examiner*—Stephen J. Novosad
*Attorney, Agent, or Firm*—Robert S. Honor; Richard E. Vila; Carol A. Loeschorn

[57] ABSTRACT

A method of accessing water from an aquifer which underlies an impervious stratum without contamination of the aquifer by polluted water from above the stratum by drilling a bore hole to the aquifer, comprises the steps of

(a) drilling a first bore hole into, but not through the impervious stratum and a second bore hole of smaller diameter to the aquifer;

(b) inserting therein a protective tube of diameter intermediate between those of the bore holes and which extends to the ground surface; and (c) adding a protective mortar to the annular space between the protective tube and the larger diameter bore hole;

there being circumferentially wound around the tube at the level of the protective mortar, transfer tubing which comprises radial perforations which permit passage of fluids, e.g. sealing composition from the interior of the transfer tubing to the mortar. The method works best with certain reinforced mortar formulations.

32 Claims, 2 Drawing Sheets

BOREHOLE ASSEMBLY, METHOD AND COMPOSITION THEREFOR

FIELD OF THE INVENTION

This invention relates to a process of extracting water from an aquifer which is overlaid by an impervious stratum, and to a bore structure and a mortar composition for use therein.

BACKGROUND OF THE INVENTION

It is often found that it is necessary to bore through an impervious stratum to reach an aquifer lying below it ("the lower aquifer"). This may occur because an aquifer lying above the impervious stratum ("the upper aquifer") has become polluted or depleted or both. The drilling operations carried out to access the lower aquifer are often in themselves a source of pollution because of oil, grease, drilling mud and bacteriological contamination. In addition, polluted water may seep into the lower aquifer via the annulus created between the sides of a bore hole and a bore tube inserted therein. It is normal practice to fill this annulus with grouting based on quick-setting cement, but it has been frequently observed that, very soon after drilling, the lower aquifer becomes polluted because the grouting currently used is often not completely water-tight. The perforation of an overlying impervious stratum thus risks polluting an aquifer lying beneath it.

This risk is increased when the bore hole is decommissioned, in which, conventionally, the top part of the bore tubing is pulled out and the bore hole is filled with non-watertight material, such as light concrete, gravel, and earth. At the present time, this practice is not strictly regulated.

SUMMARY OF THE INVENTION

It has now been found that it is possible to create a bore for the extraction of water from an aquifer underlying an impervious stratum, which not only prevents pollution from seeping into said aquifer from above the impervious stratum, but which also permits the bore to be decommissioned without adverse effect on the underlying aquifer. There is therefore provided, according to the present invention, a method of accessing water from an aquifer which underlies an impervious stratum by drilling a bore hole to the aquifer, comprising the steps of (a) drilling a first bore hole into, but not through, the impervious stratum and a second bore hole of smaller diameter to the aquifer;

(b) inserting therein a protective tube of diameter intermediate between those of the bore holes and which extends to the ground surface; and (c) adding a protective mortar to the annular space between the protective tube and the larger diameter bore hole;

characterised in that there is, circumferentially wound around the protective tube at the level of the protective mortar, transfer tubing which comprises radial perforations which permit passage of fluids from the interior of the transfer tubing to the mortar.

The invention additionally provides a means for the extraction of water from an aquifer which underlies an impervious stratum, comprising a bore hole extending to the aquifer, a bore hole of larger diameter extending into, but not through, said impervious stratum, a protective tube which is inserted therein, which protective tube is of diameter intermediate between the diameters of the bore holes and which extends from the stratum to the ground surface, a protective mortar placed in the annular space between larger bore hole and tube and radially-perforated transfer tubing wound circumferentially around the tube at the level of the protective mortar, the tubing allowing the passage of fluids from the transfer tubing to the mortar.

The invention further provides a method of re-establishing the imperviousness of an impervious stratum through which a bore hole has been drilled in order to reach an aquifer beneath said stratum, comprising the steps of drilling a first bore hole into, but not through, said stratum and drilling to the aquifer a second bore hole of diameter smaller than that of the first bore hole, placing therein a protective tube extending from said stratum to the surface, the diameter of which protective tube is intermediate between those of the bore holes, and adding a protective mortar to the annular space between the protective tube and the larger diameter bore hole, characterised in that there is circumferentially wound around the tube, at the level of the protective mortar, transfer tubing which comprises radial perforations which permit passage of fluids from the interior of the transfer tubing to the mortar.

The invention further provides a bore hole assembly adopted to draw water from an aquifer lying beneath an impervious stratum, comprising (a) a water withdrawal tube extending from the surface to the aquifer, and (b) a protective tube concentrically located around the water withdrawal tube and extending from the surface into, but not through, the impervious stratum and held in place at its lower end by protective mortar inserted into the annular space defined by the protective tube and a bore hole into which it fits;

further characterised in that there is wound around the protective tube, at the level of the protective mortar, transfer tubing comprising radial perforations which permit the passage of fluid from the transfer tubing to the protective mortar.

DETAILED DESCRIPTION OF THE INVENTION

The bore hole of this invention thus comprises (a) a relatively narrow bore hole extending to an aquifer which lies beneath an impervious stratum, (b) a broader bore hole which extends into, but not through, the impervious stratum, (c) a protective tube which has a diameter intermediate between those of the two bore holes and which extends from the surface to the stratum, (d) a protective mortar which is added to the annular space defined by the sides of the larger bore hole and the tube, and (e) perforated transfer tubing wound around the tube at the level of the protective mortar and adapted to permit fluids to be injected from the surface into the mortar.

It is important that the protective tube be seated at its lower end on the impervious stratum, hence the requirement that the appropriate bore hole extend into, but not through, the stratum. It must naturally extend a sufficient distance into the stratum to permit the establishment of an annulus of protective mortar of an appropriate size. This will depend on factors such as size of bore hole and depth of stratum, but the skilled person can readily ascertain this. Preferably the bore hole for the protective tube extends nearly to the bottom of the stratum.

Thus, the protective tube with the protective mortar will prevent water from above the stratum from entering the aquifer. When such a bore hole is decommissioned, the protective tube is capped and left in place, and the imperviousness of the stratum is therefore assured.

The other bore hole equipment used in conjunction with this invention is conventional. It is typical, for example, to insert into the bore hole extending to the aquifer a perforated tube which is then surrounded by gravel. Through this tube water from the aquifer is withdrawn in the normal manner.

The transfer tubing with the radial perforations is available, for example, under the trade mark FUKO (Master Builders Technologies). This particular transfer tubing is of neoprene and comprises multiple radial perforations over its entire periphery. It is wound around the protective tube in a tight helix. Naturally the perforations should all lie within the mortar, such that any fluid passed therethrough will pass only into the mortar. The separation of the perforations from the top and bottom of an annulus of mortar established between the sides of a bore and those of a protective tube depends very much on the relative dimensions of bore and tube, the depth of the mortar annulus and the composition of the mortar, but it has been found that the perforations should be no closer than 0.5 meter, preferably one meter, from either the top or the bottom of the mortar annulus.

The perforated transfer tubing solves two problems, namely, how to ascertain whether a protective mortar annulus is waterproof, and if not, how to make it so. Detection of water impermeability is a simple matter of injecting water under pressure through the transfer tubing. An excessively rapid drop in pressure will reveal an unacceptable degree of permeability on the part of the mortar. This situation can then be rectified by the injection under pressure of a fluid water-reactive sealing material which will seal any interstices and cracks and render the mortar water-impermeable. This then makes impossible the percolation of polluted water into the aquifer from above the impervious stratum. A typical example of a suitable water-reactive sealing material is "Master Flex" (trade mark)601 ex Master Builders Technologies, a solvent-free injectable resin.

One of the benefits of this invention is that both the monitoring and repair of the mortar can be carried out continually, even when the bore hole has been decommissioned, thus ensuring the long-term imperviousness of the stratum.

The mortar for use in the process of this invention may be any suitable mortar known to the art. However, it has been found that a particular mortar composition gives particularly good results. The invention therefore also provides a mortar composition which comprises
at least one hydraulic cement,
at least one admixture, (preferably a mixture of admixtures),
a mixture of sand and/or gravel and fillers,
fibres, whose nature, quantity and dimensional characteristics are chosen so that, after setting, the mortar has pliable behaviour and compressive strength measured at 24 hours at least equal to 25 mPa,
the mixture of sand and/or gravel, cement and fillers being chosen such that in a dry composition there is a continuum of particle sizes approximately between 0.1 μm and 10 mm, preferably between 0.1 μm and 8 mm, more preferably between 0.1 μm and 4 mm, and the quantities of the constituents being chosen such that the fresh mortar, after mixing with water, has a density at least equal to 1.7, a ratio of water/cement of approximately between 0.28 and 0.35 and may be pumped with traditional pumping equipment.

Preferably,
the hydraulic cement has a $C_3A$ value of about less than 5% and an $SO_3$ content of less than 5%
the hydraulic cement is chosen from special cements having high resistance to sulphates and/or to corrosive ions in the medium into which the mortar is poured,
the admixture comprises a combination of:
at least one agent which reduces the quantity of water to be employed, such as a lignosulphonate,
at least one setting retarder,
at least one plasticizer,
at least one gaseous or crystalline expansion agent, and
at least one hardening and expansion accelerator.
The nature and the proportions of said constituents are naturally chosen with a view to achieving a compatible blend.

The mixture of sand and/or gravel, cement and fillers is chosen such that there is essentially a continuum of particle sizes approximately between 0.1 μm and 10 mm, preferably between 0.1 μm and 8 mm, more preferably between 0.1 μm and 4 mm. In practice, this means that there should be present a range of materials from the very fine (for example, silica fume) to the quite coarse (for example, gravel). The sands and gravels are preferably siliceous, rounded and clean and of maximum diameter 10 mm, preferably 8 mm, more preferably 4 mm. Fillers may be selected from a wide range known to the art, silica fumes being particularly preferred. Some silica fumes are able to act as fillers and binders at the same time. The silica fumes are preferably condensed silica fumes with a density of at least 0.5, and having chemical characteristics of $SiO_2 > 85\%$ and $SO_3 < 1\%$. An ultra-fine fume (approximately 0.1 μm-20 micron) provides thixotropy, resistance to dilution and to drying of the mortar, while a coarser fume ensures that the continuum is maintained at fine sizes, thus helping achieve better workability and impermeability. Ideally, the lower size limit should be as small as possible, and it is known that ultra-fine silica fume has a component which is even smaller than the 0.1 μm particle size quoted as the minimum. This is comprehended by the use of the limit "0.1 μm" in this specification.

The total dosage thereof by weight of the cement is preferably between 5 and 9%, with a ratio of coarser silica fumes to ultra-fine ones of about 1.5. This dosage of silica fumes is desirable to obtain stability of the mortar and therefore avoid sedimentation.

This continuum gives the mortar stability by helping prevent the sedimentation of the larger constituents. It also gives maximum compactness and excellent impermeability, which helps guarantee protection of the aquifer from pollutants. In addition, the impermeability of the mortar is its primary and best protection against corrosive ions from the surrounding stratum; this guarantees durability of the construction over a long period. Moreover, the continuum helps diminish the effect of too large a water addition during mixing.

It has been found that the preferred composition of a dry, ready-to-use mortar of the type preferred for use in the present invention may be defined with reference to the overall size distribution of the various particulate components, excluding fibres. For this, reference is made to FIG. 1, which is a size distribution graph which shows cumulative size distribution curves of several constituents for mortars according to the invention, and in addition defines an area (designated "F")to which the average particle size of the dry mortar adheres. Curves C1, C2 and C3 correspond respectively to the curves of gravel, screened coarse BX-type sand and screened fine BX-type sand. Curve C4 is that of an industrial carbonate known commercially by the name RS3, MEAC 900. Curve C5 is a classic dolomite curve. Curve C6 is a curve of a filler known by the name MEAC 3000. Curves C7 to C9 refer to silica fumes known respectively by the names 3FS to 1FS.

Figure 1:
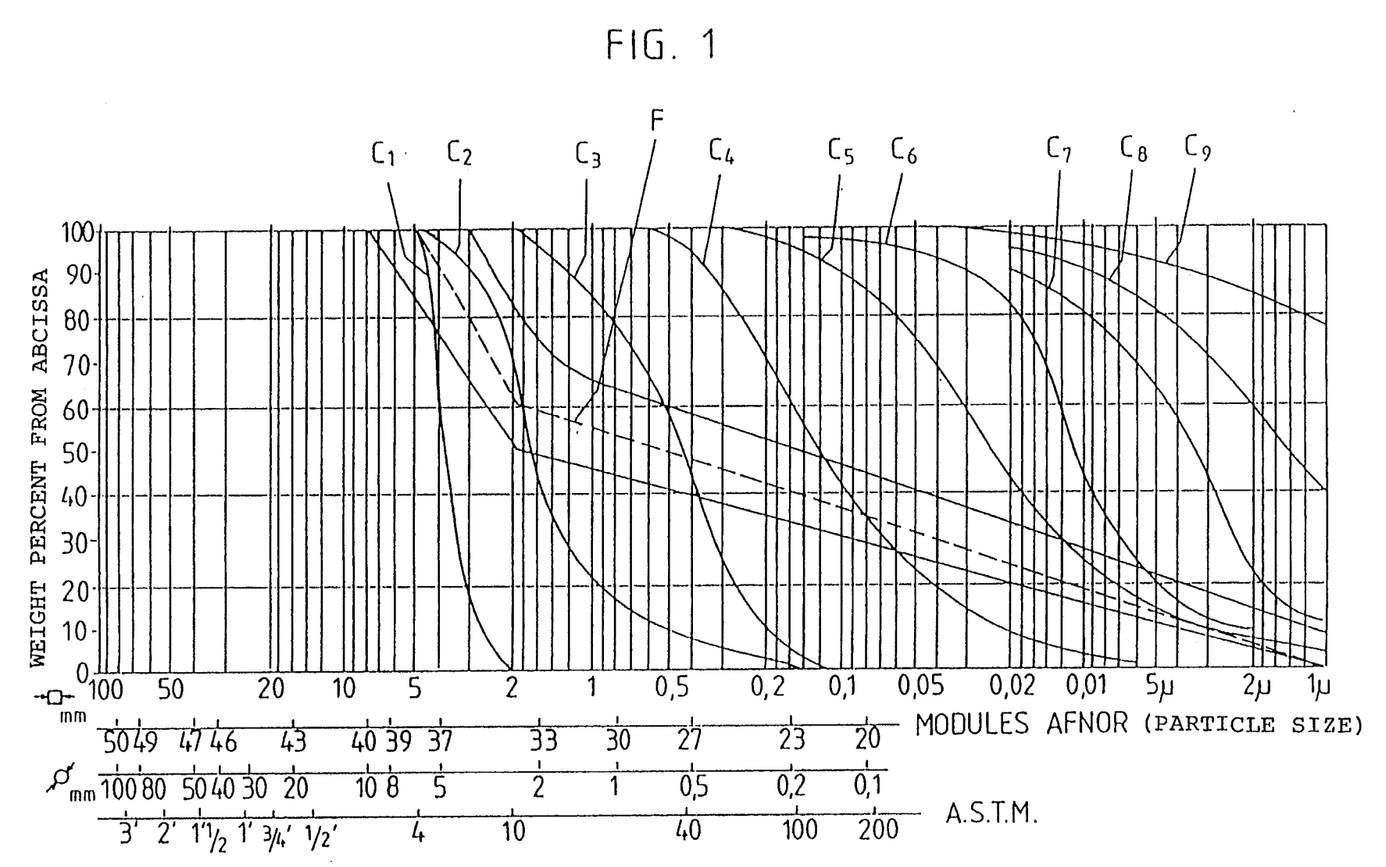
FIG. 1 is a cumulative particle size distribution graph where particle size is plotted against the percentage of the size present.

A preferred dry mortar composition according to the invention is found to have an average particle size which lies in that area of the distribution size graph bounded approximately by the two straight lines joining the points (3 mm, 100%), (1.2 mm, 67%) and (1 u, 8%), and by the two straight lines joining the points (8 mm, 100%), (2 mm, 50%) and (1µ, 0%)

Expansion agents are useful for driving the mortar into cracks and fissures, thereby helping ensure the efficient sealing of the impervious stratum. They also counter the natural tendency of mortars to shrink on setting. Typical examples of expansion agents include gaseous expansion agents, such as aluminium powder, and crystalline expansion agents, such as aluminous cement, soda, potash, excess gypsum, hydrated lime, either alone or in a mixture. Examples of commercially-available expansion agents include INTRAPLAST (trade mark) Z (Sika), FLOWCABLE (trade mark) (MBT) and STABILMAC (trade mark) (MBT).

It has been normal practice in the art to use either a gaseous or a crystalline expansion agent. It has, however, been found that, in the mortars of the present invention, particularly good results are given if the two types are used together. The invention therefore provides a mortar composition of the type hereinabove defined, wherein said composition comprises at least one gaseous expanding agent and at least one crystalline expanding agent.

Plasticizers may be chosen from those known to the art, for example, from sulphonated naphthalenes and/or melamines Setting retarders may be chosen from those known to the art, for example, sodium gluconate or analogous known compounds.

Hardening accelerators may be selected from those known to the art, for example, sodium sulphate combined with calcium chloride or with potash, or soda with calcium chloride.

The fibres may be any suitable fibres known to the art, for example, polymeric fibres, but the preferred fibres are of cast-iron, preferably corrosion-resistant and preferably being between 10 and 40 mm, more preferably between 20 and 30 mm, in length,. In its hardened state, a mortar for use in this invention comprises at least $3.10^6$, preferably at least $3.5.10^6$ fibres per $M^3$, the quantity of fibres present having to be such that the fresh mortar when mixed with water is pumpable but which, when set, is resilient to reboring after 24 hours. The hardened mortar should comprise approximately between 30 and 42 kg fibres per $M^3$, 42 Kg/$M^3$ representing the approximate upper limit of pumpability or workability for a fluid mortar composition. The fibres help spread internal stresses of crystalline expansion.

A preferred mortar composition (before the addition of fibres) comprises 27.5% to 38.5% by weight of hydraulic cement, 2.5% to 7.5% by weight of a mixture of admixtures, and 56% to 70% by weight of sand, gravel and fillers.

Specific formulations of two preferred mortar compositions are given below (quantities are expresses in % by weight).

| Constituents | Mortar no. 1 | Mortar no. 2 | Variations |
| --- | --- | --- | --- |
| gravel 4–8 mm | — | 20.000% | ±5% |
| sand 2–4 mm | 11.1600 | 13.3900% | ±5% |
| sand 0.7–1.4 mm | 18.9500 | 8.1800% | ±5% |
| sand 0.5–1 mm | 15.3200 | 11.4600% | ±5% |
| fillers 0.0–0.4 mm | 18.9500 | 8.1800% | ±5% |
| Portland cement CPA55 Type 1 | 35.000 | 30.0000% | ±10% |
| aluminium powder | 0.0035 | 0.0025% | ±0.001% |
| calcium oxide | 2.1000 | 1.8000% | ±0.5% |
| silica fume | 2.0000 | 1.2000% | ±0.5% |
| Ca BNS* powder | 0.8000 | 0.5500 | ±0.3% |
| cetyl alcohol | 0.0700 | 0.0700 | ±0.003% |
| grade of mortar | 0.4 mm | 0.8 mm | |

*β-naphthalene sulphonic acid-formaldehyde condensate

Two further preferred mortar compositions are hereinunder described, the quantities being expressed in Kg/$M^3$ of cast concrete

| Constituents | Mortar no. 3 | Mortar no. 4 |
| --- | --- | --- |
| sand 0.3–4 mm | 1050 ± 100 | — |
| sand 2–4 mm | — | 570 ± 50 |
| sand 0.1–2 mm | — | 480 ± 50 |
| sandy filler 0.01–0.5 mm | 60 ± 5 | 60 ± 5 |
| fine filler 0.0–0.1 mm | 30 ± 5 | 30 ± 5 |
| silica fume normal (3) | 32 ± 2.0 | 32 ± 2.0 |
| silica fume ultrafine (1) | 21 ± 2.0 | 21 ± 2.0 |
| hydraulic cement | 600 ± 50 | 600 ± 50 |
| water | 180 + 20 −10 | 180 + 20 −10 |
| admixtures (pure and neutralised) | 27 ± 0.5 | 27 ± 0.5 |
| TOTAL | 2000 ± 100 Kg/$M^3$ | 2000 ± 100 Kg/$M^3$ |

According to a further preferred embodiment, the mortar of the invention consists of:

hydraulic cement, sands, and, if required, rounded siliceous gravel, hard fillers based on industrial or natural carbonates of class A, B and C, condensed silica fumes, both ultra-fine and normal, corrosion-resistant cast-iron fibres, specific admixtures which combine particularly well, for example:

water reducers, for example those based on lignosulphonates, setting retarders based on sodium gluconate, plasticizers based on sulphonated naphthalenes and/or melamines, expansion agents, both gaseous and crystalline types, for example, aluminium powder (for gaseous expansion), and for crystalline expansion aluminous cement and various chemical products either alone or combined with one another, such as soda, potash, gypsum in excess and hydrated lime, hardening and slow expansion accelerators, for example sodium sulphate in conjunction with calcium chloride or with potash, or soda with calcium chloride, integral waterproofing admixtures, such as stearates or water-proofing admixtures in powder form, available commercially for example under the names "Super Sikalite" (Sika), OMICRON (MBT) or BARRA powder (MBT) —the presence of water-proofing admixtures is preferential, but is not obligatory.

The fillers chosen are preferably hard, no more than slightly absorbent and granular, thus participating in the particle size continuum of the mortar. One or two fillers are generally employed, chosen in accordance with their class A. B. C. and the fineness of the cement. The dosage thereof by weight of sand having a maximum particle size of less than 5 mm is between 5 and 10%, given that class A filler (1000 to 2500 cm²/g with 85% minimum screening through 80μ) is preferably present to the extent of 1¼ times that of class C filler (4000 to 7000 cm²/g).

Setting retarders neutralize the rheologically reactive cements (speed at which water is absorbed), increase the efficiency of plasticizers (therefore permitting low W/C ratios), increase the setting time in order to allow the mortar to be worked, and increase the duration of gaseous expansion. The very important release of hydrogen causes micro air-entrainment internally in the mass of mortar, giving a closed porosity and generating a horizontal thrust, which causes horizontal spread and consequent filling and clogging of crevices of the surrounding stratum.

The admixture may also contain hardening accelerators which, after a desired delay in setting, cause rapid hardening of the mortar between the start of setting and 24 hours. With resistance and impact strength at this age being interdependent, the compression value should be at least equal to 25 mPa for the mortar containing the fibres.

The admixture also comprises plasticizers for good fluidity of the mortar when the W/C ratio is between approximately 0.28 and 0.35. A plasticity, as measured on a Marsh cone at between 1' and 3' maximum on a channel of diameter 12.5 mm, is one of the conditions for good workability. If attainment of this plasticity were sought by means of an excess of water, the result would be a significant degree of open porosity, as well as contraction during setting and hardening which would be greater than the crystalline expansion which the mortar is seeking to achieve. This would bring about a risk of cracking and therefore of a lack of watertightness of the hardened mortar.

Another preferred mortar composition is discussed hereinunder with particular reference to the admixtures used therein. The basic constituents, expressed as Kg/M³ of mortar, are as follows:

| | |
|---|---|
| sand 2–4 mm | 570 |
| sand 0.1–2 mm | 480 |
| filler 0.01–0.5 mm | 60 |
| filler 0.0–0.1 mm | 30 |
| "Sikacrete" HD (Sika)* | 32 |
| "Sikacrete" W (Sika)** | 21 |
| cement CPA 55 | 600 |

*Silica fume functioning as both plasticizer and water-reducer because of the presence of lignosulphonates.
**Silica fume acting as a thixotropic agent preventing dilution.

The formulation of this base also contains an admixture based on aluminium silicate ("Intraplast" (trade mark) Z from Sika) in a proportion of 12 Kg/M³, useful for gaseous expansion, and, in conjunction with lignosulphonates, as a plasticizer, in which role it reduces the quantity of water. In relation to the weight of the cement, this admixture is present in a proportion of about 2% (±0.5).

Specific admixtures described hereinunder are also present in the final composition:

"Stabilmac" (trade mark) (MBT) in a proportion of 15 kg/m³, that is 2.5±0.5% in relation to the weight of the cement; this is an admixture based on calcium oxide, which attains rapid crystalline expansion between day 0 and 1, with formation of calcium hydroxide, and which also functions as a hardening accelerator.

"Barrafrost" (trade mark) (MBT) in a proportion of 6 kg/m³, that is 1±0.5% in relation to the weight of the cement; this is an antigel admixture, functioning as a plasticizer and water-reducer because of the presence of lignosulphonates, as well as a hardening accelerator, carrying out crystalline expansion of the ettringite type from days 1 to 7.

"Omicron" (trade mark) (MBT) in a proportion of 6 kg/m³, that is 1±0.5% in relation to the weight of the cement; this is an integral water-proofing admixture based on stearates, functionally as both plasticizer and water-reducer, because of the presence of lignosulphonates.

In such a composition, the quantity of water to be added to the dry mortar is 180 kg/m³.

The overdosage of lignosulphonates introduced by the admixtures creates a setting delay of at least 6 hours.

Excellent results have similarly been obtained when using the same formulation of this base mortar, containing the same quantity of admixture "Intraplast" Z, and other admixtures described hereinunder, in place of the specific admixtures hereinabove described:

"Flowcable" (trade mark) (MBT) in a proportion of 27 kg/m³, that is 4.5±0.5% in relation to the weight of the cement; this is an admixture which increases plasticity and attains primary expansion between day 0 and 1 similar to the abovementioned "Stabilmac", followed by expansion of the ettringite type from days 1 to 7. It also acts as a setting retarder and water-reducer (the ratio of W/C being less than or equal to 0.3), and as a hardening accelerator. It similarly gives strong adherence to steels.

"Omicron" (MBT) in a proportion of 6 kg/m³, as above.

In the case of this formulation, the separate admixtures contain lignosulphonates, such that a delay in setting of at least 6 hours is obtained.

It may be noted that in the mortar compositions given above by way of example, the cement CPA is conveniently used as the hydraulic cement in order to obtain a compression resistance Rc at 24 hours at least equal to 25 mPa. Tests carried out with other cements, of the type CLC or CLK, have led to Rc values at 24 hours of less than 20 mPa.

DESCRIPTION OF PREFERRED EMBODIMENTS

Figure 2:
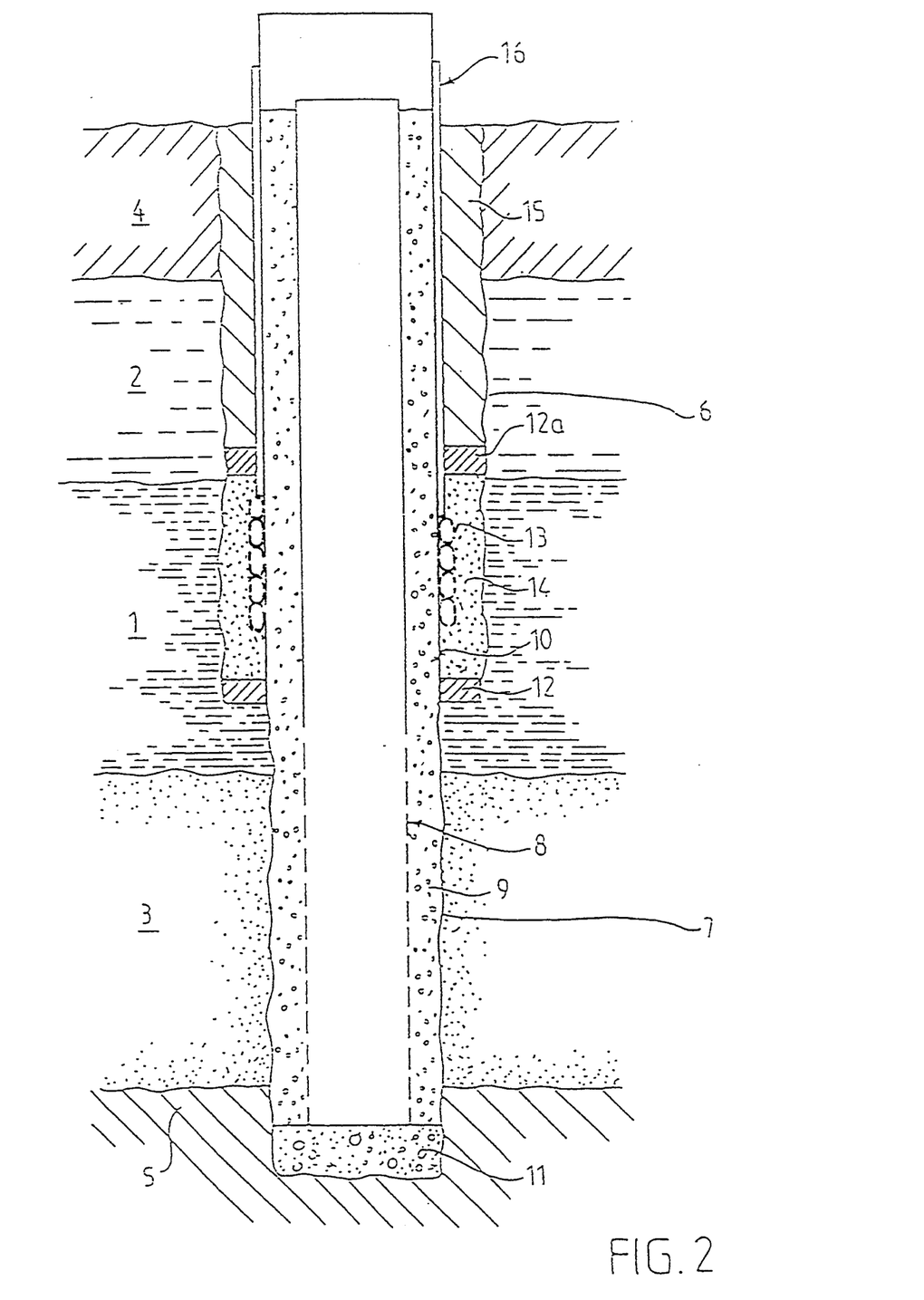
FIG. 2 is a schematic representation of a preferred embodiment of a bore hole assembly in place, shown in vertical cross-section.

In particular geological strata, two beds of sand, 2 and 3, which are aquifers, are separated by an impervious stratum of marl 1. The lower sand bed 3 rests on a bed of limestone 5. The upper bed 2 is located just below a bed of natural soil 4 which also forms the surface.

A bore for the purposes of extracting water from the lower bed 3 without admitting polluted water from the upper bed 2 to leach thereinto basically comprises two bore holes, a larger diameter bore hole 6 which extends from the surface nearly to the base of the marl layer 1, and a smaller diameter bore hole 7, concentric with bore hole 6 and extending from the surface to the limestone bed 5. Into bore hole 6 is fitted a protective tube 10, this resting at its bottom end on the marl and protruding above the surface at its top end. Into bore hole 7 is inserted a water collector tube 8, this extending from above the surface at its top end to a concrete base 11 established for it in the limestone at its lower end. This tube 8 is perforated at that part thereof which extends into the sand bed 3, from which it is intended to draw water. The annular space formed between tubes 10 and 8 is filled with grit 9 which acts as a filter.

At the base of tube 10, in the annular space defined by the outer surface of tube 10 and borehole 6, is placed a layer of an impervious material 12 (a quick-setting mortar or "Sobranite" (trade mark), a commercial material which creates a plug of clay). Above this is placed a protective mortar 14 of the type hereinabove described (the mortars actually used will be further described hereinunder). This is capped with a rapid-setting mortar 12a and the remainder of the annular space is filled with a normal mortar 15.

Helically wound around the protection tube 10 at a level corresponding to the protection mortar 14 is a radially-perforated transfer tubing 13. This is connected to the surface by means of tube 16. The transfer tubing is arranged such that the perforations lie completely within the mortar 14, being no closer than one meter to the top or base of the protective mortar annulus. This tube allows the water impermeability of the protective mortar to be tested, and if found deficient, to be rectified easily. An example of a suitable tube is FUKO neoprene tube, previously described.

The transfer tubing 13 is secured to the outer surface of tube 10 by a series of well spaced, transverse (horizontal) plastic straps (not shown) with mating ends which have saw-tooth fixtures allowing the straps to be tightened if needed but not readily loosened.

A useful water-reactive material is "Master Flex" (trade mark) 601 (MBT), which is a solvent-free, injectable resin of low viscosity, with two components whose principal constituents are polymers which swell in water. This resin hardens whilst remaining flexible, even at low temperature. It is hydrophilic and impregnates the moist surfaces thoroughly. It prevents oxidation of the steel, is unaffected by grease, metal or concrete. It is resistant to weak acids, saline solutions, oils, fats and hydrocarbons.

Two preferred compositions of mortar to be used in the process of this invention are as follows (given here as dry compositions prior to addition of cast-iron fibres):

| First composition: sand 2.0–3.15 mm quantity to make up 100% | | |
|---|---|---|
| sand 0.7–1.4 mm | 14.6% | ±5% |
| sand 0.0–0.4 mm | 18.95% | ±5% |
| sand 0.5–1.0 mm | 15.32% | ±5% |
| gravel 6–8 mm | 0.0% | |
| calcium beta-naphthalene sulphonate in powder form | 0.8% | ±0.3% |
| cetyl alcohol (foam inhibitor) | 0.07% | ±0.03% |
| silica fume | 2.0% | ±1% |
| calcium oxide (crystalline expansion agent) | 2.1% | ±0.5% |
| aluminium powder (gaseous expansion agent) | 0.0035% | ±0.001% |
| Portland cement CPA 55 Type I | 35.0% | ±10% |
| Second composition: sand 2.0–3.15 mm quantity to make up 100% | | |
| sand 0.7–1.4 mm | 13.35% | ±5% |
| sand 0.0–0.4 mm | 8.18% | ±5% |
| sand 0.5–1.0 mm | 11.46% | ±5% |
| gravel 6–8 mm | 20.0% | ±5% |
| calcium beta-naphthalene sulphonate in powder form | 0.55% | ±0.3% |
| cetyl alcohol (antifoam) | 0.07% | ±0.03% |
| silica fume | 1.2% | ±1% |
| calcium oxide (crystalline expansion agent) | 1.8% | ±0.5% |
| aluminium powder (gaseous expansion agent) | 0.0025% | ±0.001% |
| Portland cement CPA 55 Type I | 30.0% | ±10% |

The fibres of the preferred type hereinabove described are added at a rate of about 42 Kg/M$^3$.

The mortar according to the invention has sufficient resilience to allow the driller to work in the drilling area soon after the injection (after half a day or one day at most). For this, the mortar 14 is rapid-hardening, but non-brittle.

The addition of fibres, preferably cast-iron fibres, fundamentally modifies the mechanical behaviour of the mortar in that they permit expansion to be controlled and contained. Whereas a mortar or grout without fibres breaks in a brittle manner (as soon as a crack appears, the rupture is complete), the expanded mortar which is reinforced with fibres has ductile behaviour: when the mortar receives shocks from a tool communicated through the protective tube 10, the stresses are taken up by the fibres and cracking is stopped. It would be necessary for the stress to increase or for the shocks always to be always reproduced at the same spot for cracking to continue and to lead to rupture of the mortar.

This ductile behaviour is translated into very good resistance to shocks and excellent tenacity of concretes which are reinforced with cast-iron fibres. A minimum of 3,000,000 and preferably 3,500,000 fibres per M$^3$ of cast mortar are necessary in order to obtain good resilience after 24 hours with 20 mPa of compression.

The characteristics of fresh mortar are as follows:
particle size range: 0/4 or 0/8 mm depending on the nature of the annular space,
plasticity: 1' to 3' with fibres in a Marsh cone of 12.5 mm diameter,
cohesive, non-dilutable and thixotropic to be resistant to water circulation,
pumpable at low pressure and incapable of giving up water when subjected to normal water reduction treatments, such as centrifugation,
exudation at 3 hours: nil, no sedimentation,
density of fresh mortar: 1.950±0.15,
initial set ≧6 hours depending on the size of the borehole,
volumetric expansion in the plastic phase ≧2%, but capable of modification in accordance with the surrounding stratum,
yield by volume: 25 kg of special mortar +3 liters ±0.5 l of water=15 liters of grout ±1 liter of grout.

The characteristics of hardened mortar are as follows:
resistance to compression at 24 hours with fibres >25 mPa,
no shrinkage
primary thrust of crystalline expansion from initial set to 2 days, secondary from days 1 to 28 and longer, ≧5 bars if the container is not ductile
very good resilience at 24 hours (Rc at 24 hours ≧25 mPa), with more than 3,000,000, in particular more than 3,500,000 cast-iron fibres (ex Pont a Mousson) per $M^3$ of cast mortar
pH≧12
very good resistance to corrosive water (choice of cement according to the nature of the corrosive ions)
intrinsic permeability to water with constant flow below 1 bar lower than $10^{-10}$ m/s, preferably lower than $10^{-11}$ m/s.

The mortar is put into place by the methods normally employed in the art. The mortar is typically pumped, and a suitable pump is, for example, an endless-screw pump of the type commercialized by the company Master Builders Technologies under the name MEYCO (Registered Trademark) DEGUNA 20.

Preparation of the mortar is effected by mixing the cement conveyed by an endless screw and air with aggregates (sand and gravel) on the one hand and silica fume and powdered admixtures on the other hand.

The water employed for mixing with the mortar is preferably clean and free from organic matter. Mixing is carried out in a temperature range of between 5° and 35° C. After placing two-thirds of the quantity of mixing water in a mixer, the ready-to-use mortar is added, and is mixed at low speed for two minutes, the remaining one-third of water then being mixed in, mixing being carried out at high speed for three minutes. This is then added to the annular space between the sides of the borehole 6 and the protection tube 10, after the bottom of this space has been filled with a plug of "Sobranite" or rapid-setting mortar 12, so that the protection mortar 14 does not go back into the protection tube 10 or migrate into the underlying bed 3. There is approximately constant feed from of the pump, care being taken to ensure that air entrainment is excluded. Cementation of the annular space is carried out from the bottom to the top by means of a plunger pipe. In order to obtain a uniform loading, the metallic tip is continuously plunged from a height of 1 or 2 m into the mortar, preferably with continuous addition. Cementation of the top plug 12a, and of the part 15 which does not have to be rendered water-tight, is carried out with the same material and with the same technique, but using a traditional mortar 0/5 mm, measured at a minimum to 650 kg of CLC or CLK, optionally containing admixtures. The traditional cementation is carried out immediately, so as to counteract the expansion of the underlying mortar during the plastic phase and to effect horizontal expansion efforts towards the stratum 1, in order to fill in all the crevices, especially on difficult ground. The upper plug 12a of rapid-setting mortar plays the role of a wedge, and prevents the expanding mortar from lifting the column of normal mortar 15, while this latter is in the plastic phase.

There are many other possible embodiments which fall within the scope of this invention which are not mentioned here, but which are well within the skill of the art and will be readily be appreciated as such by persons skilled in the art. The skilled person will also appreciate that any dimensions of apparatus given herein are purely exemplary, and that these may be readily varied, should the need arise.

I claim:

1. A method of accessing water from an aquifer which underlies an impervious stratum by drilling a bore hole to the aquifer, comprising the steps of
   (a) drilling a first bore hole into, but not through, the impervious stratum and a second bore hole of smaller diameter to the aquifer;
   (b) inserting therein a protective tube of diameter intermediate between those of the bore holes and which extends to the ground surface; and
   (c) adding a protective mortar to the annular space between the protective tube and the larger diameter bore hole; and
   (d) providing a transfer tubing, circumferentially wound around the tube at the level of the protective mortar, having radial perforations which permit passage of fluids from the interior of the transfer tubing to the mortar.

2. A method according to claim 1 wherein said protective mortar comprises
   i) at least one hydraulic cement;
   ii) at least one admixture;
   iii) a mixture of sand and/or gravel and fillers; and
   iv) fibres, whose nature, quantity and dimensional characteristics are chosen so that, after setting, the mortar has pliable behaviour and a compression resistance of at least 25 mPa at 24 hours;
   provided said mixture of sand and/or gravel and fillers when combined with said cement forms a dry composition having a continuum of particle sizes approximately between 0.1 um and 10 mm; and
   further provided that the quantities of i)–iv) are chosen such that said mortar composition, after mixing with water, has a density at least equal to 1.7 and a ratio of water/cement of between about 0.28 and 0.35.

3. A method according to claim 2 wherein the hydraulic cement has a $C_3A$ value of less than 5% and an $SO_3$ content of less than 5% and is chosen from special cements having high resistance to sulphates and/or to corrosive ions present in the medium into which the mortar is to be poured, and the admixture comprises a combination of:
   at least one agent which reduces the quantity of water to be employed;
   at least one setting retarder;
   at least one plasticizer;
   at least one gaseous or crystalline expansion agent; and
   at least one hardening and expansion accelerator.

4. A method according to claim 3 which includes both gaseous and crystalline expansion agents.

5. A method according to claim 2 wherein said dry composition has an average particle size which, when plotted on a distribution size graph in which weight percentage of particles present (ordinate) is plotted against particle size (abscissa), lies in an area bounded approximately by two straight lines joining the points (3 mm, 100%), (1.2 mm, 67%) and (1 u, 8%) and by two straight lines joining the points (8 mm, 100%), (2 mm, 50%) and (1 u, 0%).

6. A method according to claim 2 wherein the fibres are of corrosion-resistant cast-iron and are present in sufficient quantity such that said mortar composition, when hardened, comprises at least $3 \times 10^6$ fibres/M$^3$ and approximately 30–42 Kg fibres/M$^3$.

7. A method according to claim 2 wherein said protective mortar composition comprises
  27.5% to 38.5% by weight of hydraulic cement;
  2.5% to 7.5% by weight of a mixture of admixtures; and
  56% to 70% by weight of sand, gravel and fillers.

8. A method according to claim 2 comprising
  hydraulic cement;
  sands, and optionally additionally rounded siliceous gravel;
  hard fillers based on industrial or natural carbonates of class A, B and C;
  ultra-fine and normal condensed silica fumes;
  corrosion-resistant cast-iron fibres;
  a combination of admixtures comprising
    water reducers based on lignosulphonates,
    setting retarders based on gluconates,
    plasticizers based on sulphonated naphthalenes and/or melamines,
    gaseous and crystalline expansion agents, selected from the group consisting of aluminium powder and soda, potash, gypsum and hydrated lime,
    hardening and slow expansion accelerators selected from sodium sulphate in conjunction with calcium chloride or potash, and soda with calcium chloride, and optionally
    integral waterproofing admixtures selected from stearates, or commercial waterproofing admixtures in powder form.

9. A means for the extraction of water from an aquifer which underlies an impervious stratum, comprising a bore hole extending to the aquifer, a bore hole of larger diameter extending into, but not through, said impervious stratum, a protective tube which is inserted therein, which protective tube is of diameter intermediate between the diameters of the bore holes and which extends from the stratum to the ground surface, a protective motor placed in the annular space between larger bore hole and tube and radially-perforated transfer tubing wound circumferentially around the tube at the level of the protective mortar, the tubing allowing the passage of fluids from the transfer tubing to the mortar.

10. A means according to claim 9 wherein said protective mortar comprises
  i) at least one hydraulic cement;
  ii) at least one admixture;
  iii) a mixture of sand and/or gravel and fillers; and
  iv) fibres, whose nature, quantity and dimensional characteristics are chosen so that, after setting, the mortar has pliable behaviour and compression resistance of at least 25 mPa at 24 hours;
  provided said mixture of sand and/or gravel and fillers when combined with said cement forms of dry composition having a continuum of particle size approximately between 0.1 um and 10 mm; and
  further provided quantities of i)-iv) are chosen such that said mortar composition, after mixing with water, has a density at least equal to 1.7 and a ratio of water/cement of between about 0.28 and 0.35.

11. A means according to claim 10 wherein the hydraulic cement has a $C_3A$ of less than 5% and an $SO_3$ content of less than 5% and is chosen from special cements having high resistance to sulphates and/or to corrosive ions present in the medium into which the mortar is to be poured, and the admixture comprises a combination of:
  at least one agent which reduces the quantity of water to be employed;
  at least one setting retarder;
  at least one plasticizer;
  at least one gaseous or crystalline expansion agent; and
  at least one hardening and expansion accelerator.

12. A means according to claim 11 which includes both gaseous and crystalline expansion agents.

13. A means according to claim 10 wherein said dry composition has an average particle size which, when plotted on a distribution size graph in which weight percentage of particles present (ordinate) is plotted against particle size (abscissa), lies in an area bounded approximately by two straight lines joining the points (3 mm, 100%), (1.2 mm, 67%) and (1 u, 8%), and by two straight lines joining the points (8 mm, 100%), (2 mm, 50%) and (1 u, 0%).

14. A means according to claim 10 wherein the fibres are of corrosion-resistant cast-iron and are present in sufficient quantity such that said mortar composition, wherein hardened, comprises at least $3 \times 10^6$ fibres/M$^3$ and approximately 30–42 Kg fibres/M$^3$.

15. A means according to claim 10 wherein said protective mortar composition comprises
  27.5% to 38.5% by weight of hydraulic cement;
  2.5% to 7.5% by weight of a mixture of admixtures; and
  56% to 70% by weight of sand, gravel and fillers.

16. A means according to claim 10 comprising
  hydraulic cement;
  sands, and optionally additionally rounded siliceous gravel;
  hard fillers based on industrial or natural carbonates of class A, B and C;
  ultra-fine and normal condensed silica fumes;
  corrosion-resistant cast-iron fibres;
  a combination of admixtures comprising
    water reducers based on lignosulphonates,
    setting retarders based on gluconates,
    plasticizers based on sulphonated naphthalenes and/or melamines,
    gaseous and crystalline expansion agents, selected from the group consisting of aluminium powder and soda, potash, gypsum and hydrated lime,
    hardening and slow expansion accelerators selected from sodium sulphate in conjunction with calcium chloride or potash, and soda with calcium chloride, and optionally
    integral waterproofing admixtures selected from stearates, or commercial waterproofing admixtures in powder form.

17. A method of re-establishing the imperviousness of an impervious stratum through which a bore hole has been drilled in order to reach an aquifer beneath said stratum, comprising the steps of drilling a first bore hole into, but not through, said stratum and drilling to the aquifer a second bore hole of diameter smaller than that of the first bore hole, placing therein a protective tube extending from said stratum to the surface, the diameter of which protective tube is intermediate between those of the bore holes, adding a protective mortar to the annular space between the protective tube and the larger diameter bore hole, and providing a transfer tubing, circumferentially wound around the tube, at the level of the protective mortar, having radial perforations which permit passage of fluids from the interior of the transfer tubing to the mortar.

18. A method according to claim 15 wherein said protective mortar comprises
   i) at least one hydraulic cement;
   ii) at least one admixture;
   iii) a mixture of sand and/or gravel and fillers; and
   iv) fibres, whose nature, quantity and dimensional characteristics are chosen so that, after setting, the mortar has pliable behaviour and a compression resistance of at least 25 mPa at 24 hours;
   provided said mixture of sand and/or gravel and fillers when combined with said cement forms a dry composition having a continuum of particle sizes approximately between 0.1 um and 10 mm; and
   further provided that the quantities of i)–iv) are chosen such that said mortar composition, after mixing with water, has a density at least equal to 1.7 and a ratio of water/cement of between about 0.28 and 0.35.

19. A method according to claim 18 wherein the hydraulic cement has a $C_3A$ value of less than 5% and an $SO_3$ content of less than 5% and is chosen from special cements having high resistance to sulphates and/or to corrosive ions present in the medium into which the mortar is to be poured, and the admixture comprises a combination of:
   at least one agent which reduces the quantity of water to be employed;
   at least one setting retarder;
   at least one plasticizer;
   at least one gaseous or crystalline expansion agent; and
   at least one hardening and expansion accelerator.

20. A method according to claim 19 which includes both gaseous and crystalline expansion agents.

21. A method according to claim 18 wherein said dry composition has an average particle size which, when plotted on a distribution size graph in which weight percentage of particles present (ordinate) is plotted against particle size (abscissa), lies in an area bounded approximately by two straight lines joining the points (3 mm, 100%), (1.2 mm, 67%) and (1 u, 8%), and by two straight lines joining the points (8 mm, 100%), (2 mm, 50%) and (1 u, 0%).

22. A method according to claim 18 wherein the fibres are of corrosion-resistant castiron and are present in sufficient quantity such that said mortar composition, when hardened, comprises at least $3 \times 10^6$ fibres/$M^3$ and approximately 30–42 Kg fibres/$M^3$.

23. A method according to claim 18 wherein said protective mortar composition comprises
   27.5% to 38.5% by weight of hydraulic cement;
   2.5% to 7.5% by weight of a mixture of admixtures; and
   56% to 70% by weight of sand, gravel and fillers.

24. A method according to claim 18 comprising
   hydraulic cement;
   sands, and optionally additionally rounded siliceous gravel;
   hard fillers based on industrial or natural carbonates of class A, B and C;
   ultra-fine and normal condensed silica fumes;
   corrosion-resistant cast-iron fibres;
   a combination of admixtures comprising
      water reducers based on lignosulphonates,
      setting retarders based on gluconates,
      plasticizers based on sulphonated naphthalenes and/or melamines,
      gaseous and crystalline expansion agents, selected from the group consisting of aluminium powder and soda, potash, gypsum and hydrated lime,
      hardening and slow expansion accelerators selected from sodium sulphate in conjunction with calcium chloride or potash, and soda with calcium chloride, and optionally
      integral waterproofing admixtures selected from stearates, or commercial waterproofing admixtures in powder form.

25. A bore hole assembly adopted to draw water from an aquifer lying beneath an impervious stratum, comprising
   (a) a water withdrawal tube extending from the surface to the aquifer; and
   (b) a protective tube concentrically located around the water withdrawal tube and extending from the surface into, but not through, the impervious stratum and held in place at its lower end by protective mortar inserted into the annular space defined by the protective tube and a bore hole into which it fits;
   further characterised in that there is wound around the protective tube, at the level of the protective mortar, transfer tubing comprising radial perforations which permit the passage of fluid from the transfer tubing to the protective mortar.

26. A bore hole assembly according to claims 25 wherein said protective mortar comprises
   i) at least one hydraulic cement;
   ii) at least one admixture;
   iii) a mixture of sand and/or gravel and fillers; and
   iv) fibres, whose nature, quantity and dimensional characteristics are chosen so that, after setting, the mortar has pliable behaviour and compression resistance of at least 25 mPa at 24 hours;
   provided said mixture of sand and/or gravel and fillers when combined with said cement forms a dry composition having a continuum of particle sizes approximately between 0.1 um and 10 mm; and
   further provided that the quantities of i)–iv) are chosen such that said mortar composition, after mixing with water, has a density at least equal to 1.7 and a ratio of water/cement of between about 0.28 and 0.35.

27. A bore hole assembly according to claim 26 wherein the hydraulic cement has a $C_3A$ value of less than 5% and as $SO_3$ content of less than 5% and is chosen from special cements having resistance to sulphates and/or to corrosive ions present in the medium into which the mortar is to be poured, and the admixture comprises a combination of:

at least one agent which reduces the quantity of water to be employed;

at least one setting retarder;

at least one plasticizer;

at least one gaseous or crystalline expansion agent; and at least one hardening and expansion accelerator.

28. A bore hole assembly according to claim 27 which includes both gaseous and crystalline expansion agents.

29. A bore hole assembly according to claim 26 wherein said dry composition has an average particle size which, when plotted on a distribution size graph in which weight percentage of particles present (ordinate) is plotted against particle size (abscissa), lies in an area bounded approximately by two straight lines joining the points (3 mm, 100%), (1.2 mm, 67%) and (1 u, 8%), and by two straight lines joining the points (8 mm, 100%), (2 mm, 50%) and (1 u, 0%).

30. A bore hole assembly according to claim 26 wherein the fibres are of corrosion-resistant cast-iron and are present in sufficient quantity such that said mortar composition, when hardened, comprises at least $3 \times 10^6$ fibres/$M^3$ and approximately 30–42 Kg fibres/$M^3$.

31. A bore hole assembly according to claim 26 wherein said protective mortar composition comprises 27.5% to 38.5% by weight of hydraulic cement;

2.5% to 7.5% by weight of a mixture of admixtures; and

56% to 70% by weight of sand, gravel and fillers.

32. A bore hole assembly according to claim 26 comprising hydraulic cement;

sands, and optionally additionally rounded siliceous gravel;

hard fillers based on industrial or natural carbonates of class A, B and C;

ultra-fine and normal condensed silica fumes;

corrosion-resistant cast-iron fibres;

a combination of admixtures comprising water reducers based on lignosulphonates, setting retarders based on gluconates, plasticizers based on sulphonated naphthalenes and/or melamines, gaseous and crystalline expansion agents, selected from the group consisting of aluminium powder and soda, potash, gypsum and hydrated lime, hardening and slow expansion accelerators selected from sodium sulphate in conjunction with calcium chloride or potash, and soda with calcium chloride, and optionally integral waterproofing admixtures selected from stearates, or commercial waterproofing admixtures in powder form.

* * * * *